Figure 1:

(No Model.)

E. KEMPSHALL.
BUTTON FASTENER.

No. 301,450. Patented July 1, 1884.

Attest:
Philip F. Larner
Howell T. Battle

Inventor:
Eleazer Kempshall
By Wm E Wood
Attorney.

UNITED STATES PATENT OFFICE.

ELEAZER KEMPSHALL, OF NEW BRITAIN, CONNECTICUT.

BUTTON-FASTENER.

SPECIFICATION forming part of Letters Patent No. 301,450, dated July 1, 1884.

Application filed August 15, 1883. (No model.)

*To all whom it may concern:*

Be it known that I, ELEAZER KEMPSHALL, of New Britain, in the county of Hartford and State of Connecticut, have invented certain new and useful Improvements in Button-Fasteners; and I do hereby declare that the following specification, taken in connection with the drawings furnished and forming a part of the same, is a clear, true, and complete description of my said improvements.

So far as my knowledge extends, I am the first to devise a button-fastener having an integral head-bar and hook cut from sheet metal in such a manner that the metal in the head-bar is presented edgewise for affording a bearing or abutting surface for contact with the interior of a shoe, thus enabling said head-bar to be practically embedded in the lining of a shoe, all as shown and described in my Letters Patent dated August 7, 1883, No. 282,903. My said prior button-fastener has the point of its hook located adjacent to and opposite one side of the head-bar, so that the entire hook portion of the fastener, when in use, occupies the hole in a shoe; but I have now devised a button-fastener which possesses the economic advantages, the strength, and the embedding capacity of my said prior fastener, coupled with a capacity for being somewhat more easily applied to service, and I also obtain a complete housing for a prolonged tip or point of the hook when used on lined shoes.

I am aware that sheet-metal button-fasteners have heretofore been provided with a hook having an elongated tip or point capable of being housed beneath the lining of a shoe; but, so far as my knowledge extends, such have invariably had the hook developed from a portion of a slitted disk-head, and requiring, therefore, a bend outward from the under side of the disk-head, then a return-bend to form the hook, and then a final bend to provide for location of the prolonged tip of the hook in a plane practically parallel with the under or bearing surface of the disk-head. My improved fastener can be produced in precisely the desired contour or form without involving any actual bending of the metal; or, as in my prior fastener, the shank of the hook can first be bent upon or toward itself, and then its tip or point bent so as to locate it in a plane practically parallel with the plane of the bearing-surface of the head-bar. When made without bending, my novel fasteners have the hook and its prolonged point wholly parallel with the inner or bearing surface of one end of the head-bar; but when the hook is bent as described it can either be parallel with said head-bar or project in a line at right angles from and below said head-bar.

To more particularly describe my said invention, I will refer to the accompanying drawings, in which—

Figure 2:
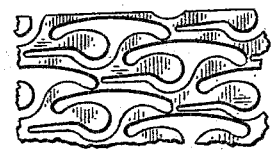
Figure 3:
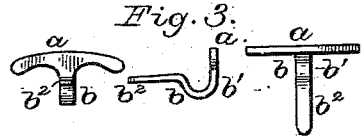
Figure 4:
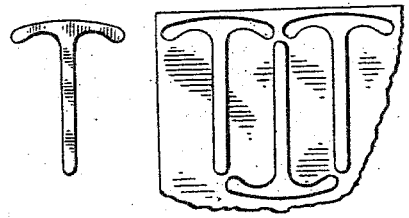
Figure 5:
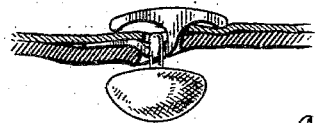

Figure 1 illustrates in three enlarged views—viz., side, top, and end view—one of my fasteners in its preferred form. Fig. 2 illustrates a portion of a sheet of metal from which fasteners like Fig. 1 have been cut. Fig. 3 illustrates in three enlarged views—viz., side, end, and top view—one of my fasteners somewhat different in form. Fig. 4 illustrates in side view a blank and a portion of a sheet of metal from which such blanks have been cut for making the fastener, Fig. 3. Fig. 5 illustrates the fastener, Fig. 1, as in use with a button on a lined shoe. The sheet-metal views are given to thoroughly indicate the character of the cuts requisite for producing the novel fasteners, and also to assuredly convey a correct idea of their novel characteristics.

It will be seen that the head-bar $a$ of the fastener, Fig. 1, has its inner or bearing surface presented edgewise of the metal, and that the hook portion $b$ has its shank $b'$ projected from the head-bar slightly to the one side of the middle thereof, and the hook point or tip $b^2$ extended or prolonged beneath the bearing-surface of the head-bar and parallel therewith, and that all of the metal of which the fastener is composed is in its normal or unbent condition, and that when applied to a lined shoe the tip $b^2$ of the hook is readily housed between the lining and the upper. While the tip on the hook, as shown, affords the most desirable results, I have produced very serviceable fasteners having the head-bar and hook, as shown, but without the tip, in which case the point of the hook is slightly bent inward toward the shank after the button-eye has been placed in position, and such a fastener forms the subject of a separate contemporaneous application filed by me. Whether the tip be employed on the hook or not, it will be seen that the cut edge of said hook serves as the engaging-surface for the shank-eye of the button, and that I deem to be an important feature, in that the metal is presented edgewise to the strains incident to use, and is much stiffer and less liable to be straightened out than if a bent portion of the metal occupied the button-eye flatwise. So far as my knowledge extends, this is the first sheet-metal button-fastener ever devised in which every portion of its outline or contour is provided for by cutting alone, as distinguished from both cutting and bending, as heretofore, and for that reason I am enabled to produce this particular form of fastener ready for use at one operation, and obviate the additional bending operation heretofore requisite in making fasteners from sheet metal. While I make special claim to this form of fastener, it is to be understood that I do not limit myself thereto, because many of the advantages of the main feature of my invention will accrue if the fasteners be formed from blanks, which not only involve bending operations for developing the fastener into the desired form, but also if it have its hook tip or point at right angles to the head-bar. As seen in Fig. 3, I have the same head-bar, $a$, presented edgewise to afford a bearing or abutting surface, the hook-shank $b'$ projecting directly therefrom, with its metal in its normal or unbent condition, and the hook $b$ formed by a single bend toward the shank and toward the adjacent side of the head-bar, and its prolonged tip $b^2$ bent outward away from the head-bar and at right angles thereto, but in a plane parallel therewith, but below it. In all prior sheet-metal button-fasteners having a prolonged tip or point on the hook a slotted disk-head has been employed, and the shank of the hook at its junction with the disk-head involved a bend, so as to first make said shank stand off at right angles to the plane of the inner or bearing surface of the disk; but it will be observed that in my fasteners there is no bending of the metal at said junction-point, and that I obtain in my fastener, Fig. 3, the requisite contour for my hook by bending the metal once toward the shank and once outwardly or away from it.

It will readily be seen that my fastener, in form like that shown in Fig. 1, may be made from the blanks shown in Fig. 4, in which case the first bend to form the hook is made toward one end of the head-bar, (instead of at right angles thereto, as before described,) and by then bending it upward and away from the shank, so that the elongated tip of the hook will be parallel with the head-bar.

Having thus described my invention, I claim as new—

1. A sheet-metal button-fastener having a head-bar which presents an edgewise bearing or abutting surface, and integral therewith a hook which is provided with an elongated tip or point, which is extended outwardly or away from the shank of the hook, substantially as described, whereby the head-bar may be well embedded when in use, and the prolonged hook-tip be housed or covered when in use, as set forth.

2. The sheet-metal button-fastener having a head-bar which presents an edgewise bearing or abutting surface, and a hook integral therewith provided with an elongated tip or point, which is parallel with the inner or bearing surface of one end of the head-bar, substantially as described.

3. A button-fastener having an integral head-bar and hook, both in the same plane and cut from sheet metal, the cut edge of said hook serving as the engaging-surface for the shank-eye of a button, substantially as described.

ELEAZER KEMPSHALL.

Witnesses:
ALICE L. KEMPSHALL,
JAMES SHEPARD.